United States Patent [19]

Onagi

[11] Patent Number: 5,592,445
[45] Date of Patent: Jan. 7, 1997

[54] EXCHANGE COUPLING OPTICAL RECORDING MEDIUM AND RECORDING/REPRODUCING DEVICE THEREFOR

[75] Inventor: Nobuaki Onagi, Tsurugashima, Japan

[73] Assignee: Pioneer Electronic Corporation, Tokyo-to, Japan

[21] Appl. No.: 321,547

[22] Filed: Oct. 12, 1994

[30] Foreign Application Priority Data

Oct. 13, 1993 [JP] Japan ................................... 5-255393

[51] Int. Cl.⁶ .................................................. G11B 11/00
[52] U.S. Cl. ................................................ 369/13; 360/59
[58] Field of Search .............................. 369/13, 14, 288,
369/275.2, 110, 116, 100, 275.1, 284; 360/59, 114, 73.08, 73.02

[56] References Cited

U.S. PATENT DOCUMENTS

| | | | |
|---|---|---|---|
| 4,771,347 | 9/1988 | Horimai et al. | 360/59 |
| 4,910,622 | 3/1990 | Saito et al. | 369/13 X |
| 4,955,007 | 9/1990 | Aratani et al. | 369/13 |
| 5,164,926 | 11/1992 | Matsumoto | 369/13 |
| 5,168,482 | 12/1992 | Aratani et al. | 369/13 |
| 5,187,694 | 2/1993 | Ichihara et al. | 369/13 |
| 5,240,784 | 8/1993 | Matsumoto | 369/13 X |

OTHER PUBLICATIONS

Proc. Int. Symp. on Optical Memory, 1987, Japanese Journal of Applied Physics, vol. 26 (1987) Supp. 26-4 by Saito et al.

*Primary Examiner*—Ali Neyzari
*Attorney, Agent, or Firm*—Kane, Dalsimer, Sullivan, Kurucz, Levy, Eisele and Richard, LLP

[57] ABSTRACT

A magneto-optical recording medium includes: a mask layer having a first compensation temperature higher than a predetermined reproduction temperature and lower than a predetermined first recording temperature, a first Curie temperature higher than a predetermined second recording temperature and a first coercive force, and for storing information assigned to magnetizing directions; and an information recording layer having a second compensation temperature higher than the reproduction temperature and lower than the first compensation temperature, a second Curie temperature lower than the second recording temperature and a second coercive force, and for storing information assigned to magnetizing directions.

11 Claims, 7 Drawing Sheets

↓ : "0"

↑ : "1"

EXCHANGE COUPLING OPTICAL RECORDING MEDIUM AND RECORDING/REPRODUCING DEVICE THEREFOR

BACKGROUND OF THE INVENTION

1. Field of the Invention

This invention relates to an optical recording medium, a device for recording information on the recording medium and a device for reproducing information from the recording medium. More particularly, this invention relates to an optical recording medium which records information thereon with spatial frequency higher than a normal spatial frequency which is specified by wavelength of a read-out light and numerical aperture of an objective lens, and a device for recording and reproducing information on and from the optical recording medium.

2. Description of Prior Art

As shown in FIGS. 1A and 1B, in order to reproduce information from an optical disc such as a CD (Compact Disc), an LD (Laser Disc) or the like, a read-out laser light is irradiated on pits P (phase pits) to detect reduction in quantity of reflected light which occurs due to diffraction, scattering or variation of optical constant of the pit, whereby information corresponding to presence or absence of the pits is obtained. More specifically, when the spot of the read-out laser light is irradiated onto the pit, as shown in FIG. 1A, the quantity of return light which is reflected is small due to scattering or the like. On the other hand, when the spot of the read-out laser light is irradiated in a gap between pits, i.e., off the pit as shown in FIG. 1B, the quantity of the return light is large. Information recorded on the optical disc is read out utilizing the difference in quantity of the return light as described above. However, in such cases, a reproduction resolution of the optical disc is restricted by the wavelength $\lambda$ of the read-out laser light and the numerical aperture NA, and therefore information having spatial frequency higher than the spatial frequency $fc=2NA/\lambda$ cannot be reproduced.

SUMMARY OF THE INVENTION

It is an object of the present invention to provide an optical recording medium capable of recording information with a spatial frequency higher than the spatial frequency $fc=2NA/\lambda$, specified by the wavelength $\lambda$ of a read-out laser light and the numerical aperture NA of an objective lens.

It is another object of the present invention to provide a device for recording and reproducing information on and from the above optical recording medium.

According to one aspect of the present invention, there is provided a magneto-optical recording medium including: a mask layer having a first compensation temperature higher than a predetermined reproduction temperature and lower than a predetermined first recording temperature, a first Curie temperature lower than a predetermined second recording temperature and a first coercive force, and for storing information assigned to magnetizing directions; and an information recording layer having a second compensation temperature higher than the reproduction temperature and lower than the first compensation temperature, a second Curie temperature lower than the second recording temperature and a second coercive force, and for storing information assigned to magnetizing directions.

According to another aspect of the present invention, there is provided a device for recording information on a magneto-optical recording medium described above, the device including: a light irradiating unit for irradiating recording light on a recording position of the recording medium; a first magnetic field applying unit for applying first magnetic field having a first magnetizing direction; a second magnetic field applying unit for applying second magnetic field having a second magnetizing direction opposite to the first magnetizing direction; a first control unit for controlling power of the recording light so that temperature of the recording position becomes substantially equal to the first recording temperature; and a second control unit for controlling power of the recording light beam so that temperature of the recording position becomes substantially equal to the second recording temperature.

According to still another aspect of the present invention, there is provided a device for reproducing information from a magneto-optical recording medium described above, the device including: a light irradiating unit for irradiating a read-out light having a predetermined polarization surface on a reproducing position of the recording medium; an initializing magnetic field applying unit for applying an initializing magnetic field for magnetizing the mask layer in a first magnetizing direction; a reproduction magnetic field applying unit for applying a reproduction magnetic field having magnetizing direction substantially opposite to the first magnetizing direction at the reproducing position; a control unit for controlling power of the read-out light so that temperature of the recording medium at the reproducing position becomes equal to the reproduction temperature; a separating unit for separating a component of a light having a rotation direction of the polarization surface corresponding to one of the magnetization directions of the initializing magnetic field and the reproducing magnetic field from the read-out light reflected by the recording medium; a light receiving unit for receiving the light separated by the separating unit and generating read-out signal; and a reproduction unit for reproducing information recorded on the recording medium on the basis of the read-out signal.

The nature, utility and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Preferred embodiments according to this invention will be hereunder described with reference to the accompanying drawings.

Figure 1A:
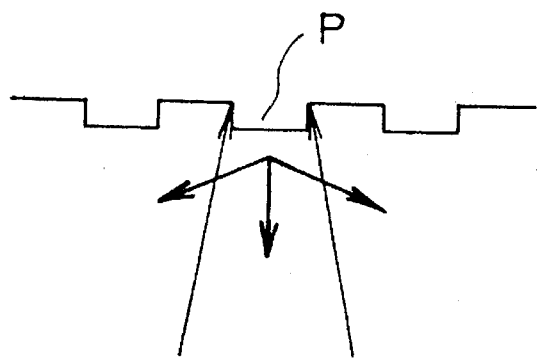
FIGS. 1A and 1B are schematic diagrams illustrating information read-out principle.
Figure 1B:
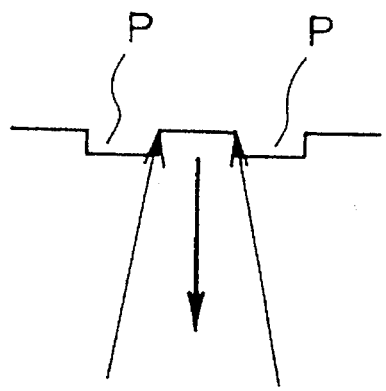
Figure 2:
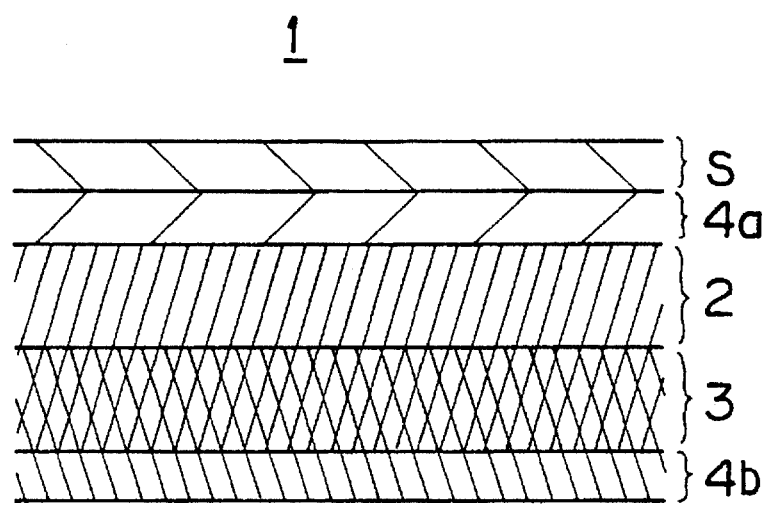
FIG. 2 is a cross-sectional view illustrating a fundamental structure of an optical disc according to the present invention.

FIG. 2 is a cross-sectional view illustrating fundamental construction of an optical disc according to this invention. As shown in FIG. 2, the optical disc 1 includes a substrate S, a mask layer 2 for masking information pit in reproduction and holding initializing information in overwrite deletion, a information recording layer 3 on which information pits are formed, a protection layer 4a for protecting the mask layer 2 and a protection layer 4b for protecting the information recording layer 3. In the following description, the combination of the mask layer 2, the information recording layer 3 and the protection layers 4a and 4b is referred to as a magneto-optical layer. As the mask layer 2, GdFeCo or TbFeCo may be used, for example, and as the information recording layer 3, TbFeCo or DyFeCo may be used, for example.

Figure 3A:
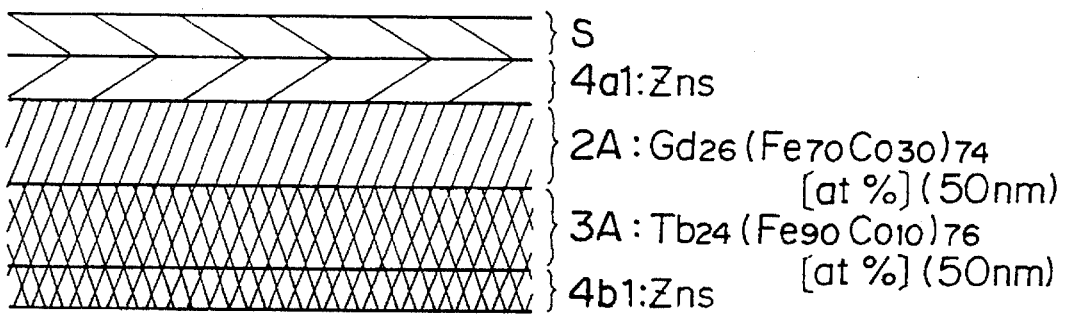
FIGS. 3A to 3C are cross-sectional views illustrating concrete constructions of examples of optical disc shown in FIG. 2.
Figure 3B:
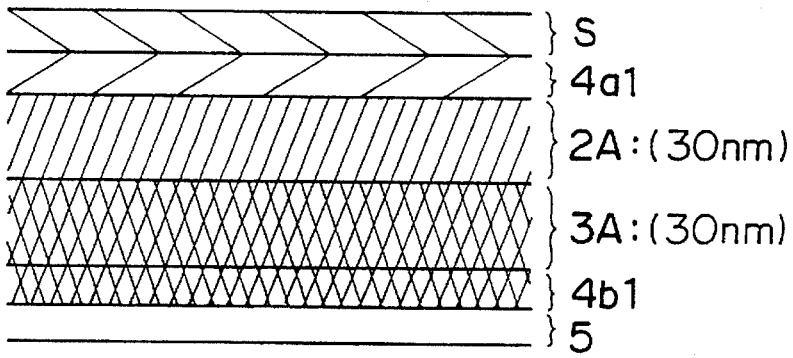
Figure 3C:
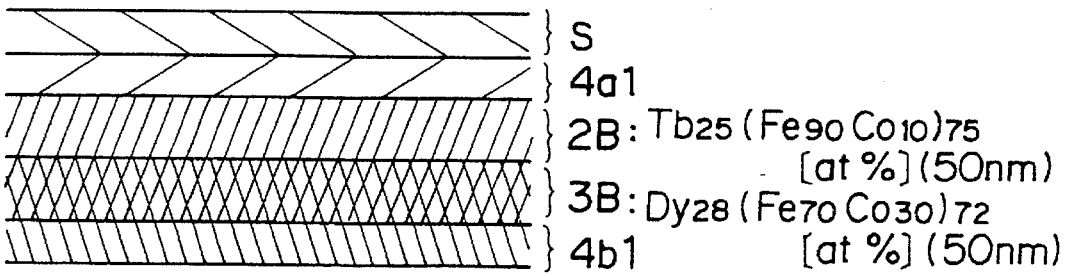

FIGS. 3A to 3C illustrate examples of the optical disc shown in FIG. 2. As shown in FIG. 3A, the optical disc 1A is so designed that a dielectric protection layer 4a1 made of ZnS, a mask layer 2A made of $Gd_{26}(Fe_{90}Co_{10})_{76}$ [at %] (50 nm thickness) having magneto-optic effect, an information recording layer 3A made of $Tb_{24}(Fe_{90}Co_{10})_{76}$ [at %] (50 nm thickness) having magneto-optic effect, and a dielectric protection layer 4b1 made of ZnS are formed on the substrate S in this order. The thickness values in parentheses are represented as examples. In this case, the rotation of the polarization surface is mainly caused by Kerr effect.

The optical disc shown in FIG. 3A does not need a reflection layer because the mask layer 2A and the information recording layer 3A have high reflectivity. However, when the thicknesses of the mask layer 2A and the information recording layer 3A are increased to be about 30 nm to thereby increase transmittance so that the optical disc 1B can be used as a reflection-type optical disc, a reflection layer 5 should be required as shown in FIG. 3B. Al, Au or the like is preferably used for the reflection layer 5. In this case, the rotation of the polarization surface is mainly caused by Faraday effect.

FIG. 3C illustrates another example of the optical disc shown in FIG. 2. The optical disc 1C is so designed that a dielectric protection layer 4a1 made of an ZnS, a mask layer 2B made of a $Tb_{25}(Fe_{90}Co_{10})_{75}$ [at %] (50 nm thickness) having magneto-optic effect, an information recording layer 3B made of $Dy_{28}(Fe_{70}Co_{30})_{72}$ [at %] (50 nm thickness) having magneto-optic effect, and a dielectric protection layer 4b1 made of ZnS are formed on the substrate S in this order. The thickness values in parentheses are represented as examples.

Next, various conditions required in operation of the optical disc will be described. In order to have the optical disc perform normal operation, a temperature of information recording position or information reproducing position is required to satisfy the following condition:

Room Temperature<Reproduction Temperature <Temperature for deleting overwrite data (writing "0")<Temperature for writing overwrite data (writing "1").

By doing so, at the time of reproduction, information on the information recording layer 3 is transferred to a portion on the mask layer 2 where the temperature thereof exceeds the Reproduction Temperature by exchange coupling force, and fine resolution reproduction can be performed. At the time of deleting overwrite data (writing "0"), the mask layer 2 is initialized by an external initializing magnetic field, and then magnetic domain of the mask layer 2 directed to the initializing direction is transferred to the information recording layer 3 by exchange coupling force. At the time of writing overwrite data (writing "1"), temperature of the recording position of the optical disc is increased to be higher than the Curie point temperatures of the mask layer 2 and the information recording layer 3, and then data is written by applying an external writing magnetic field. In the above operation, reproduction and overwrite-data deletion utilize exchange coupling force between the mask layer 2 and the information recording layer 3, however, transmitting directions of the coupling force are opposite to each other.

In order to reverse transmitting directions of exchange coupling forces according to the temperature of recording or reproducing position, the following conditions are satisfied:

Room Temperature<$T_r$<$T_{WL}$<$T_{C1}$, and $T_C$<$T_{WH}$.

Here, it is assumed that both the mask layer 2 and the information recording layer 3 has compensation point, and temperature at the time of reproduction is expressed by $T_r$, temperature at the time of overwrite data deletion is expressed by $T_{WL}$, Curie temperature of the mask layer 2 is expressed $T_{C1}$, Curie temperature of the information recording layer 3 is expressed by $T_{C2}$ and temperature at the time of overwrite data writing is expressed by $T_{WH}$. It is noted that either one of the Curie temperature $T_{C1}$ of the mask layer 2 and the Curie temperature $T_{C2}$ of the information recording layer 3 may be higher than the other. More preferably, the following condition is satisfied as shown in FIG. 4, when compensation point temperature of the mask layer 2 is expressed by $T_{comp1}$ and compensation point temperature of the information recording layer 3 is expressed by $T_{comp2}$:

Room Temperature<$T_r$<$T_{comp2}$<$T_{comp1}$<$T_{WL}$<$T_{C1}$, and $T_{C2}$<$T_{WH}$.

Figure 4:
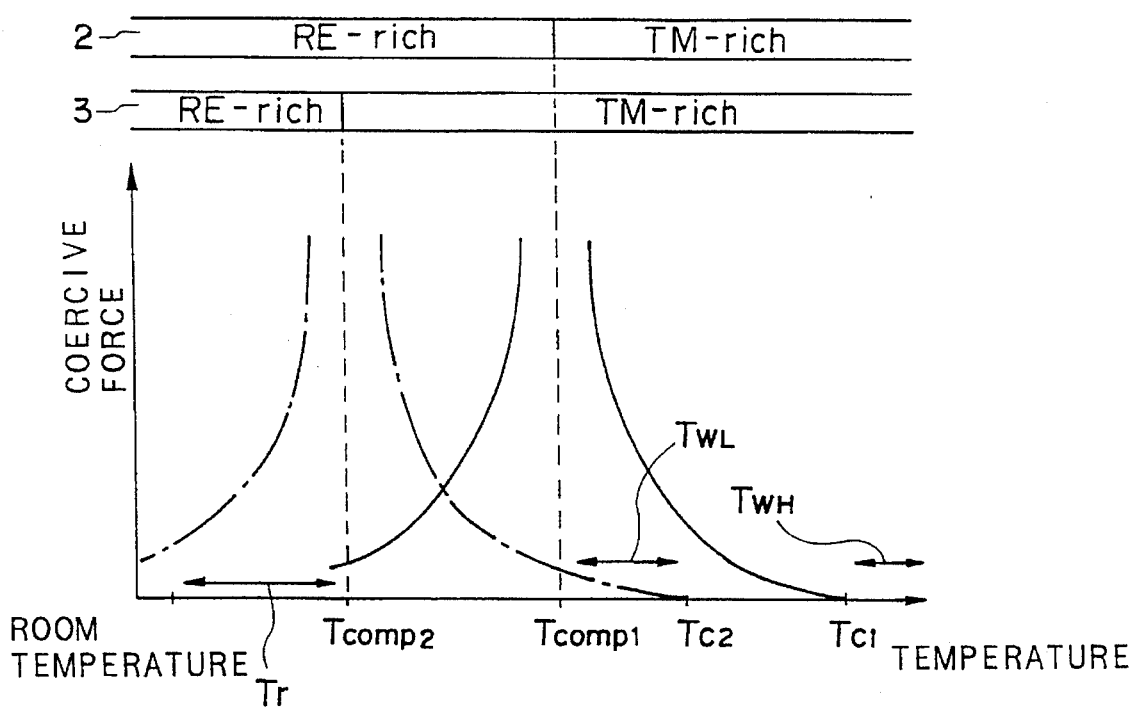
FIG. 4 is a diagram illustrating relation between temperature of the layers and coercive forces.

By satisfying the above conditions, when data is transferred utilizing exchange coupling force, both of the mask layer 2 and the information recording layer 3 richly contains transition metal component (hereinafter referred to as "TM-rich") at the time of reproduction, and both of the mask layer 2 and the information recording layer 3 richly contains rare earth component (hereinafter referred to as "RE-rich") at the time of overwrite data deletion, as shown in FIG. 4. As a result, data transferring is more efficiently carried out.

Next, other conditions will be examined. In the following examination, it is assumed that the mask layer 2 itself has a coercive force $H_1$, a saturation magnetization $M_1$ and thickness $t_1$, and the information recording layer 3 itself has coercive force $H_2$, a saturation magnetization $H_2$ and thickness $t_2$. Further, surface domain-walls energy by exchange coupling between two layers is expressed by $\sigma_w$, initializing magnetic field is expressed by $H_{ini}$, reproduction magnetic field is expressed by $H_r$, and writing magnetic field at the time of overwrite data writing is expressed by $H_{ex}$.

(a) Condition at room temperature:

At room temperature, the following formulas should be satisfied:

$$H_1+(\sigma_w/(M_1 \cdot t_1))<H_{ini}<H_2-(\sigma_w/(M_2 \cdot t_2)) \quad (1),$$

$$H_1+(\sigma_w/(M_1 \cdot t_1))<H_2-(\sigma_w/(M_2 \cdot t_2)) \quad (2A),$$

and $$H_1<H_2 \quad (2B).$$

The formula (1) defines a condition in which only the mask layer 2 is initialized by the initializing magnet field. The formulas (2) and (3) define condition in which recording data is maintained at room temperature.

(b) Condition for reproduction:

At the time of reproduction, the following formulas should be satisfied:

$$H_1+(\sigma_w/(M_1 \cdot t_1))<H_2-(\sigma_w/(M_2 \cdot t_2)) \quad (3A),$$

$$H_1<H_2 \quad (3B),$$

$$H_1+(\sigma_w/(M_1 \cdot t_1))+H_r \quad (4),$$

and $$H_1+(\sigma_w/(M_1 \cdot t_2))-H_r \quad (5).$$

The formulas (3A) and (3B) define a condition in which recording data is maintained at the time of reproduction, the formula (4) defines condition in which recording data on the information recording layer 3 is transferred to the mask layer 2, and the formula (5) define a condition in which recording data on the information recording layer is maintained at the time of reproduction.

(c) Condition for overwrite data deletion (writing "0"):

At the time of overwrite data deletion (writing "0"), the following formulas should be satisfied:

$$H_1+(\sigma_w/(M_1 \cdot t_1))>H_2-(\sigma_w/(M_2 \cdot t_2)) \quad (6A),$$

$$H_1>H_2 \quad (6B),$$

$$H_1+(\sigma_w/(M_1 \cdot t_1))+H_{ex} \quad (7A),$$

$$H_2>H_{ex} \quad (7B),$$

$$H_2<(\sigma_w/(M_1 \cdot t_1))-H_{ex} \quad (8A),$$

and $$H_2<H_{ex} \quad (8B).$$

The formulas (6A) and (6B) define a condition in which recording data is deleted. The formulas (7A) and (7B) define a condition in which recording data on the mask layer 2 (initializing data) is transferred to the information recording layer 3. In this case, it is required that the writing magnetic field $H_{ex}$ does not delete initializing data on the mask layer 2. The formula (8A) and (8B) define a condition in which recording data on the information recording layer 3 is deleted.

(d) Condition for overwrite data writing (writing "1"):

At the time of overwrite data writing (writing "0"), the following formula should be satisfied:

$$T_{C1}, T_{C2}<T_{WH} \quad (9)$$

The formula (9) defines a condition required for Curie point writing to both of the mask layer 2 and the information recording layer 3. As a result, both of the layers 2 and 3 temporarily lose magnetization and data is written by the writing magnetic field $H_{ex}$ applied at the time of cooling.

As described above, in the present invention, compensation point material is used for the mask layer 2 and the information recording layer 3, and relationship between the coercive force $H_1$ of the mask layer 2 and the coercive force $H_2$ of the information recording layer 3 remarkably varies depending upon the temperature of information recording or reproducing point. This is represented by the above formulas in which directions of the sign of inequality are opposite between the formulas (3A), (3B) and (6A), (6B), (4) and (7A), (7B), (5) and (8A), (8B). Thereby, transmitting directions of the exchange coupling forces can be directed opposite to each other.

Next, principles of recording and reproducing information on and from the optical disc will be described.

(1) Reproduction Principle

Figure 5A:
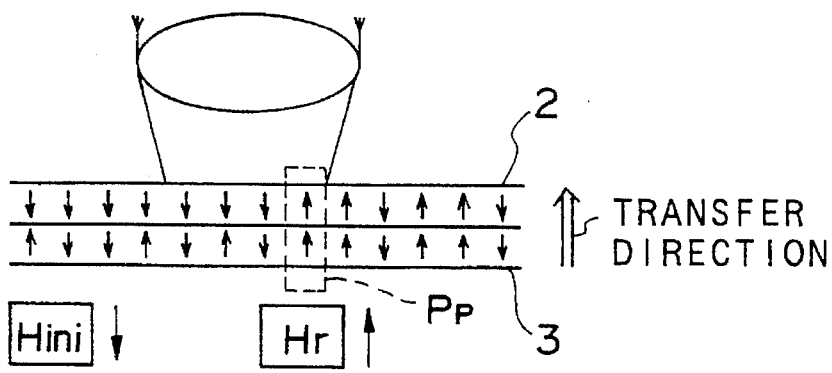
FIGS. 5A to 5C are diagrams illustrating principles of reproduction, overwrite deletion and overwrite writing.

At the time of reproduction, the mask layer 2 is magnetized by the initializing magnetic field $H_{ini}$ so that all regions of the mask layer 2 have the same vertical magnetizing direction (downward direction (corresponding to data "0") in FIG. 5A). Then, a read-out light having a predetermined polarization surface is irradiated on a reproducing position $P_p$ on the magneto-optical recording medium so that the temperature of the mask layer 2 and the information recording layer 3 at the reproducing position $P_p$ become substantially equal to the reproduction temperature. By this, when temperature of the mask layer 2 at the reproducing position $P_p$ exceeds the reproduction temperature $T_r$, coercive force of the mask layer 2 decreases, and recording data on the information recording layer 3 is transferred to the mask layer 2 by exchange coupling force. However, within a beam-spot of the read-out light, an area other than the reproducing position $P_p$ still has the magnetizing direction of the initializing magnetic field $H_{ini}$. As a result, according to magneto-optic effect such as Kerr effect or Faraday effect, polarization surface of the read-out light beam is rotated by a certain angle ($+\theta$ or $-\theta$) dependent upon the magnetization direction of the mask layer 2, and a reproduction light having polarization surface thus rotated is detected by a detector. Therefore, if the two kinds of reproduction lights having different polarization surfaces are separated using a separation unit such as a polarizing filter or differential optical system, pit information of a portion (i.e., reproducing position $P_p$) within the read-out light spot can be selectively detected. This is optically equivalent to that a pin hole having smaller aperture than the diameter r of the read-out light spot which is defined by the wavelength $\lambda$ of the read-out light and the numerical aperture NA is formed on the information recording surface of the optical disc, so that plural fine-size phase pits existing in the read-out light spot, that is, phase pits having high spatial frequency f (f>fc) can be reproduced.

(2) Overwrite deletion Principle

Figure 5B:
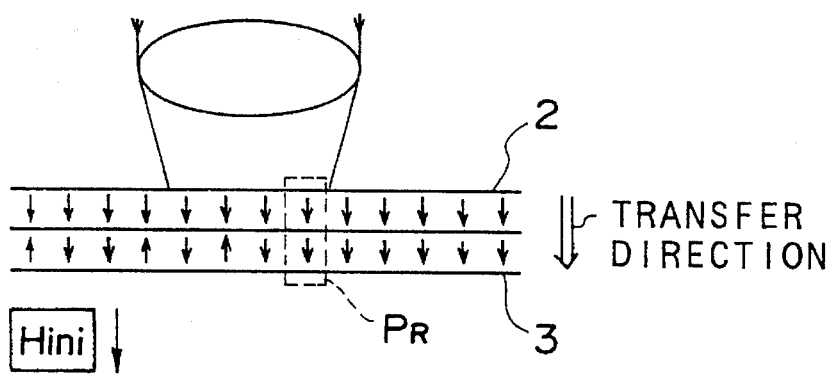

At the time of overwrite deletion, the mask layer 2 is magnetized by the initializing magnetic field $H_{ini}$ so that all regions of the mask layer 2 have the same vertical magnetizing direction (downward direction (corresponding to data "0") in FIG. 5B). Then, a recording light is irradiated on a recording position $P_R$ on the magneto-optical recording medium so that the temperature of the mask layer 2 and the information recording layer 3 at the recording position $P_R$ become substantially equal to the temperature $T_{WL}$ for the overwrite deletion. By this, coercive force of the mask layer 2 increases and the coercive force of the information recording layer 3 decreases, and therefore recording data on the mask layer 2 is transferred to the information recording layer 3 by exchange coupling force. As a result, magnetization direction of the information recording layer 3 at the recording position $P_R$ is directed to the same direction (downward direction (corresponding to data "0") in FIG. 5B). Thus overwrite deletion is performed. In this case, the overwrite deletion can be carried out onto the area only corresponding to the recording position $P_R$ at minimum, and fine resolution recording is achieved by optical modulation.

(3) Overwrite Writing Principle

At the time of overwrite writing, a recording light is irradiated on a recording position $P_R$ on the magneto-optical recording medium so that temperature of the recording position $P_R$ become substantially equal to the overwrite writing temperature $T_{WH}$ higher than the Curie temperature $T_{C1}$ of the mask layer 2 and the Curie temperature $T_{C2}$ of the information recording layer 3. By this, the mask layer 2 and the information recording layer 3 lose coercive force (magnetization). Thereafter, the writing magnetic field $H_{ex}$ having upward magnetization direction (corresponding to data "1") is applied to the mask layer 2 and the information recording layer 3. As a result, in the cooling process, magnetization direction of the mask layer 2 and the information recording layer 3 at the recording position $P_R$ are aligned to the same direction (upward direction (corresponding to data "1" in FIG. 5C). Thus, overwrite writing is performed. In this case, the overwrite deletion can be carried out onto the area only corresponding to the recording position $P_R$ at minimum, and fine resolution recording is achieved by optical modulation.

Figure 6:
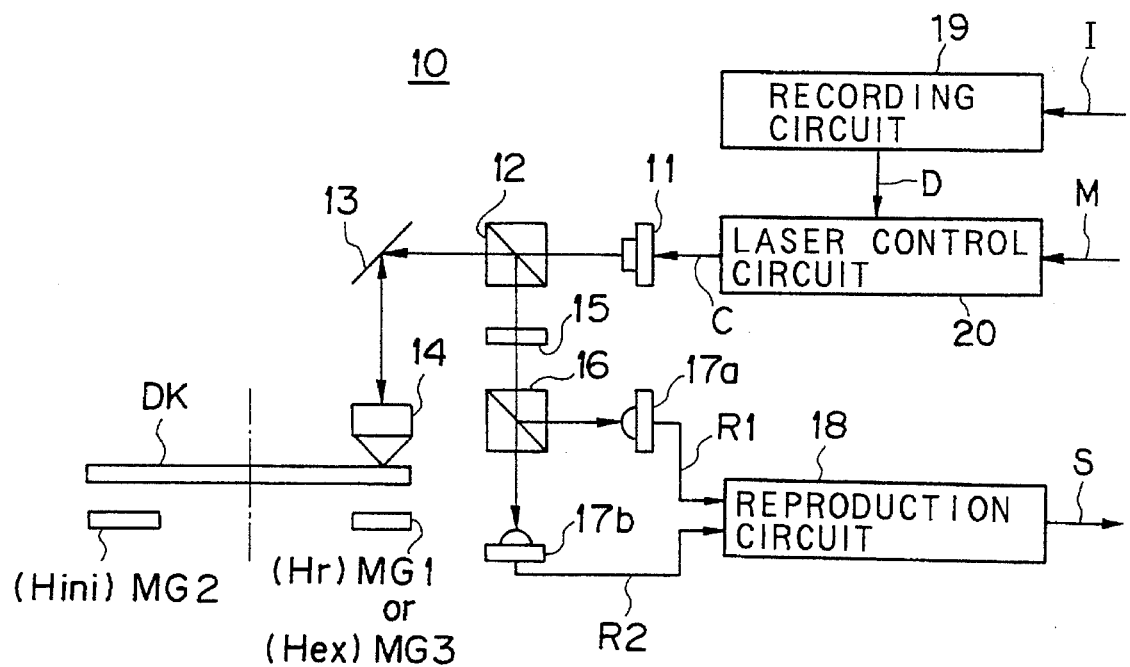
FIG. 6 is a schematic diagram illustrating a construction of an optical disc recording/reproducing device.

Next, an operation of information recording and reproducing device for the optical disc according to the present invention will be described. FIG. 6 is a schematic diagram illustrating a construction of an optical disc recording and reproducing device. The optical disc recording and reproducing device 10 includes a recording circuit and a laser control circuit 20. The recording circuit 19 outputs recording control data D for performing optical modulation overwrite recording based on a recording information signal I supplied from external. The laser control circuit 20 outputs control signal C, based on a mode selection signal M supplied from external, for setting the laser power to be read-out laser power at the time of reproduction and setting the laser power to be recording laser power corresponding to recording control data D at the time of recording. The device 10 further includes a laser diode 11 for emitting a laser beam serving as recording and read-out light beam, a beam splitter 12 for passing the incident laser beam therethrough and reflecting a laser beam incident from a mirror, a mirror 13 for guiding the laser beam, an objective lens 14 for converging the laser beam on information recording surface of the optical disc DK, a half-wave plate 15 for adjusting the ratio of the reflected-light quantity and the transmitted-light quantity, at a position of polarizing beam splitter, of a light beam from non-read-out regions of the reproducing light reflected from the beam splitter 12, a polarizing beam splitter 16 for passing therethrough only a polarized light having a predetermined polarization state and reflecting other lights, a first light-receiving element 17a for receiving the polarized light reflected from the polarizing beam splitter 16 and outputting it as a first read-out signal (RF signal) R1, a second light-receiving element 17b for receiving a polarized light transmitted through the polarizing beam splitter 16 and outputting it as a second read-out signal R2, a reproducing circuit 18 including a decoder, an amplifier, etc. for converting the read-out signals R1 and R2 to a reproduced signal S and outputting the reproduced signal S, a magnet MG1 for applying reproduction magnetic field $H_r$, a magnet MG2 for applying initializing magnetic field $H_{ini}$, and a magnet MG3 for applying writing magnetic field $H_{ex}$.

Next, the operation of the device will be described with reference to FIGS. 5A to 5C, FIG. 6 and FIGS. 7A to 7C.

(1) Reproduction

Figure 7A:
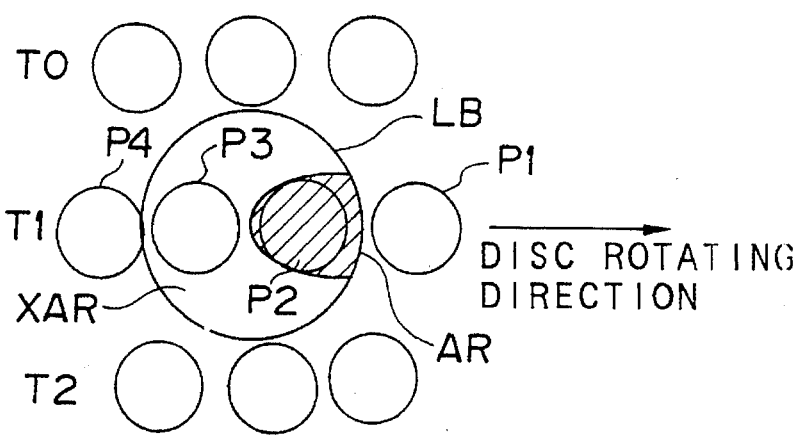
FIGS. 7A and 7B are diagrams illustrating relation between reading light spot and information pits.
Figure 7B:
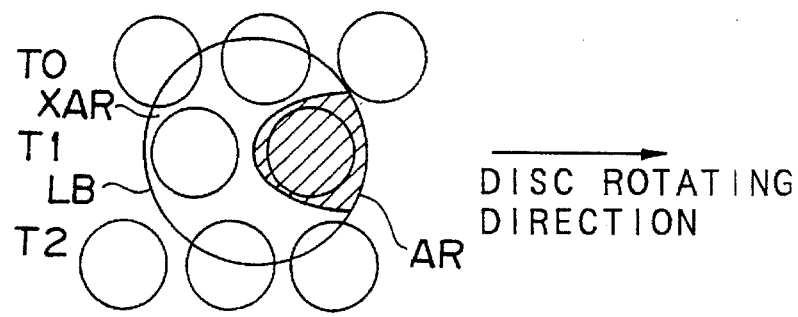

Firstly, a mode selection signal indicating reproduction mode is input, and the laser control circuit 20 controls the laser diode 11 so that power of the laser diode 11 becomes read-out laser power. Thus, the laser diode 11 emits read-out light. Simultaneously, the device 10 applies the reproduction magnetic field $H_{ini}$ to the magneto-optical layer of the optical disc DK using the magnet MG2 to align the vertical magnetization direction in a predetermined direction before a recorded information read-out operation (initialization: downward direction in FIG. 5A). The linearly-polarized read-out light emitted from the laser diode 11 is focused, through the beam splitter 12, the mirror 13 and the objective lens 14 onto the information recording surface of the optical disc DK to form the read-out spot LB on a track T1 as shown in FIG. 7A. The read-out spot LB is moved on the track T1 according to an rotation of the disc DK. On the track T1 are formed phase pits having a spatial frequency f (f>fc) higher than a spatial frequency fc=2NA/λ which is defined by the wavelength λ of the read-out light and the numerical aperture NA. Specifically, plural phase pits P2 and P3 exist in the read-out spot LB, but the information of these phase pits P2 and P3 cannot be separated with no treatment, so that the reproducing operation cannot be surely performed. Likewise, the same problem (that is, the accurate reproducing operation cannot be performed) occurs in the case where plural tracks T0, T1 and T2 are contained in the read-out light spot LB as shown in FIG. 7B.

Figure 7C:
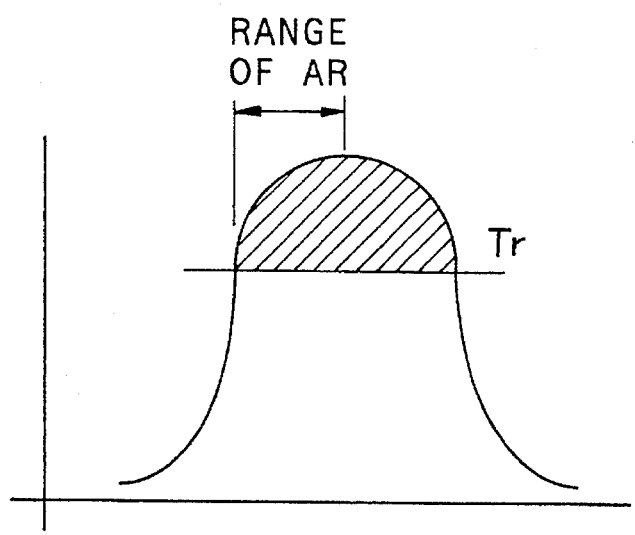
FIG. 7C is a diagram illustrating temperature distribution of the reading light spot.

In order to solve the above problem, by means of adjusting the output intensity of the read-out light, the temperature of the mask layer 2 is increased above the reproduction temperature $T_r$ at an area AR located at a rear portion of the read-out spot LB as shown in FIG. 7C, and in a case as shown in FIG. 7A, recording information is transferred from the information recording layer 3 to the mask layer 2 by exchange coupling force in the area AR where information pit P2 exists. As a result, polarization surface of the reproduction light which is reflected by the information recording surface is rotated, according to magneto-optic effect, by an angle +θ or −θ which is dependent on the vertical magnetization direction of the mask layer 2, i.e., the vertical magnetization direction of the information recording layer 3, and then the reproduction light returns to light-receiving element side. On the other hand, in an area XAR other than the area AR in the light spot LB which contains the phase pit P3, the reproduction light is returned to the light-receiving element side with its polarization surface rotated with respect to the polarization surface of the read-out light by a certain angle (e.g., constantly −θ) dependent upon the vertical magnetization direction at the time of initializing. The reproducing lights from the areas AR and XAR reach the beam-splitter 16 in composite state. However, if the halfway plate 15 is adjusted so that the quantity of the reproducing lights whose polarization surface is rotated by the angle −θ from the area AR and the area XAR are incident to each of the first and second light-receiving elements 17a and 17b in equal quantity and the beam-splitter 16 is adjusted so that reproduction light having polarization angle rotated by +θ is incident upon the first light-receiving element 17a and reproduction light having polarization surface angle rotated by −θ is incident upon the second light-receiving element 17b, only reproduction light from the area AR and having polarization angle rotated by +θ can be obtained by differentiating (calculating a differential output between) the first and second read-out signals R1 and R2. Namely, the signal components of reproducing light from the area XAR is offset, and the area XAR is apparently shielded. Accordingly, in the reproducing circuit 18, only information of the area AR, that is, the phase pit P2 can be read out, and thus the reproduced signal S contains only information of the phase pit P2. As described above, according to the first embodiment, information having the spatial frequency f higher than the spatial frequency fc (=2NA/λ) which is defined by the wavelength λ of the read-out light and the numerical aperture NA of the objective lens 14 can be reproduced.

(2) Overwrite Deletion

Firstly, when a mode selection signal M indicating recording mode is input, the laser control circuit 20 recognizes the overwrite deletion instruction from recording control data D output from the recording circuit 19. Then, the laser control circuit 20 controls the laser diode 11, based on the laser control signal C, so that power of the laser diode 11 becomes recording laser power of overwrite deletion. Thus, the laser diode 11 emits recording laser light for overwrite deletion. Simultaneously, the device 10 applies the external magnetic field $H_{ini}$ to the magneto-optical layer of the optical disc DK using the magnet MG2 to align the vertical magnetization direction in a predetermined direction before a recorded information read-out operation (downward direction in FIG. 5B). The linearly-polarized recording light emitted from the laser diode 11 is focused, through the beam splitter 12, the mirror 13 and the objective lens 14 onto the information recording surface of the optical disc DK to form the light spot LB on a track T1 as shown in FIG. 7A. The light spot LB is moved on the track T1 according to an rotation of the disc DK. By this operation, the temperature of the mask layer 2 and the information recording layer 3 at the area AR which is located rear side of the light spot LB exceeds the temperature $T_{WL}$ for overwrite deletion, and the coercive force $H_2$ of the information recording layer 3 decrease in a manner shown in FIG. 4. Therefore, data (initializing data "0") on the mask layer 2 is transferred to the information recording layer 3 by exchange coupling force. As described above, according to the present invention, overwrite deletion is carried out at the information reproducing position $P_p$ in fine resolution state.

(3) Overwrite Writing

Figure 5C:
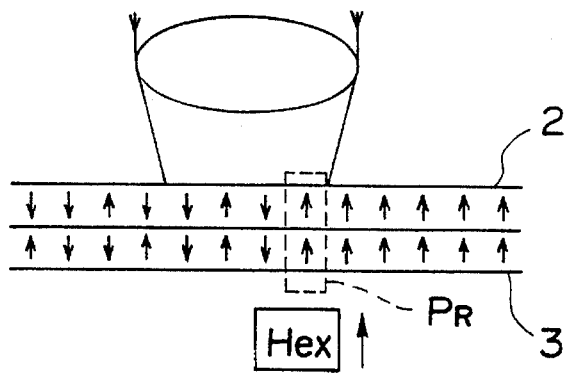

Firstly, when a mode selection signal M indicating recording mode is input, the laser control circuit 20 recognizes the overwrite writing instruction from recording control data D output from the recording circuit 19. Then, the laser control circuit 20 controls the laser diode 11, based on the laser control signal C, so that power of the laser diode 11 becomes recording laser power of overwrite writing. Thus, the laser diode 11 emits read-out light for overwrite writing. The linearly-polarized recording light emitted from the laser diode 11 is focused, through the beam splitter 12, the mirror 13 and the objective lens 14 onto the information recording surface of the optical disc DK to form the light spot LB on a track T1 as shown in FIG. 7A. The light spot LB is moved on the track T1 according to an rotation of the disc DK. By this operation, the temperature of the mask layer 2 and the information recording layer 3 at the area AR which is located rear side of the light spot LB exceeds the temperature $T_{WH}$ for overwrite writing, and the coercive force $H_1$ of the mask layer 2 and the coercive force $H_2$ of the information recording layer 3 become zero. Therefore, magnetic domain in the area AR is extinguished as shown in FIGS. 4 and 5C. Accordingly, overwrite data corresponding to writing magnetic field $H_{ex}$ applied to the recording position $P_R$ on the information recording layer 3 is written in cooling process, and recording is carried out in fine resolution state.

Modifications

In the above described embodiments, no layer is provided between the mask layer 2 and the information recording layer 3. However, an intermediate layer having small aeolotropcy of vertical magnetization, such as GDFeCo, may be provided between the two layers. This facilitates initialization and stabilizes recording and reproduction in fine resolution and overwrite recording.

In the above described embodiment, the mask layer is constituted by a monolayer. However, an exchange coupling layers such as GdFeCo/TbFe may be used as the mask layer. In such a case, synthetic coercive force of the layers constituting the mask layer 2 rapidly varies according to temperature, and operation in fine resolution is stabilized.

What is claimed is:

1. A device for recording information on a magneto-optical recording medium, said recording medium comprising:

a mask layer having a first compensation temperature higher than a predetermined reproduction temperature and lower than a predetermined first recording temperature, a first Curie temperature lower than a predetermined second recording temperature and a first coercive force, and for storing information assigned to magnetizing directions; and an information recording layer having a second compensation temperature higher than the reproduction temperature and lower than the first compensation temperature, a second Curie temperature lower than the second recording temperature and a second coercive force, and for storing information assigned to magnetizing directions, said device comprising:

a light irradiating means for irradiating recording light on a recording position of the recording medium;

a first magnetic field applying means for applying first magnetic field having a first magnetizing direction;

a second magnetic field applying means for applying second magnetic field having a second magnetizing direction opposite to the first magnetizing direction;

a first control means for controlling power of the recording light so that temperature of the recording position becomes substantially equal to the first recording temperature; and a second control means for controlling power of the recording light beam so that temperature of the recording position becomes substantially equal to the second recording temperature.

2. A device according to claim 1, wherein said mask layer transfers information stored on the mask layer to the information recording layer by exchange-coupling where temperatures of the mask layer and the information recording layer are substantially equal to the first recording temperature.

3. A device according to claim 1, wherein said mask layer and said information recording layer store information corresponding to magnetizing direction produced by an external magnetic field where temperatures of the mask layer and the information recording layer are substantially equal to the second recording temperature.

4. A device according to claim 1, wherein said mask layer and said information recording layer perform magneto-optic effect when magnetic field is applied.

5. A device according to claim 1, wherein said magneto-optical recording medium further comprises protection layers for protecting said mask layer and said information recording layer.

6. A device according to claim 1, wherein said magneto-optical recording medium further comprises a reflection layer for reflecting laser light irradiated on the optical recording medium.

7. A device for reproducing information from a magneto-optical recording medium, said recording medium comprising:

a mask layer having a first compensation temperature higher than a predetermined reproduction temperature and lower than a predetermined first recording temperature, a first Curie temperature lower than a predetermined second recording temperature and a first coercive force, and for storing information assigned to vertical magnetizing directions; and an information recording layer having a second compensation temperature higher than the reproduction temperature and lower than the first compensation temperature, a second Curie temperature lower than the second recording temperature and a second coercive force, and for storing information assigned to vertical magnetizing directions, said device comprising:

a light irradiating means for irradiating a read-out light having a predetermined polarization surface on a reproducing position of the recording medium;

an initializing magnetic field applying means for applying an initializing magnetic field for magnetizing the mask layer in a first magnetizing direction;

a reproduction magnetic field applying means for applying a reproduction magnetic field having magnetizing direction substantially opposite to the first magnetizing direction at the reproducing position;

a control means for controlling power of the readout light so that temperature of the recording medium at the reproducing position becomes equal to the reproduction temperature;

a separating means for separating a component of a light having a rotation direction of the polarization surface corresponding to one of the magnetization directions of the initializing magnetic field and the reproducing magnetic field from the read-out light reflected by the recording medium;

a light receiving means for receiving the light separated by the separating means and generating read-out signal; and a reproduction means for reproducing information recorded on the recording medium on the basis of the read-out signal.

8. A device according to claim 7, wherein said information recording layer transfers information stored on the information recording layer to the mask layer by exchange-coupling where temperature of the mask layer is substantially equal to the reproduction temperature.

9. A device according to claim 7, wherein said mask layer and said information recording layer perform magneto-optic effect when magnetic field is applied.

10. A device according to claim 7, wherein said magneto-optical recording medium further comprises protection layers for protecting said mask layer and said information recording layer.

11. A device according to claim 7, wherein said magneto-optical recording medium further comprises a reflection layer for reflecting laser light irradiated on the optical recording medium.

* * * * *